Aug. 8, 1939.  M. M. BRODERSEN ET AL  2,168,319
HEAVY DUTY SCRAPER
Filed April 6, 1936   2 Sheets—Sheet 1

INVENTORS
Max M. Brodersen

Aug. 8, 1939.   M. M. BRODERSEN ET AL   2,168,319
HEAVY DUTY SCRAPER
Filed April 6, 1936   2 Sheets-Sheet 2

INVENTORS

Patented Aug. 8, 1939

2,168,319

UNITED STATES PATENT OFFICE 2,168,319

HEAVY DUTY SCRAPER

Max M. Brodersen, Alhambra, and Len O. Bird, Glendale, Calif.; said Brodersen assignor to said Bird Application April 6, 1936, Serial No. 72,934

10 Claims. (Cl. 37—126)

This invention relates generally to scrapers and particularly to the type known as heavy duty, carryall scrapers, by means of which large amounts of material may be removed, and it is an improvement in the type of heavy duty scrapers described in our application for Letters Patent, filed March 25, 1935, Serial No. 12,812.

Of the manifold objects of this invention, the principal one is to provide a heavy duty scraper of the jointed frame type having a bowl, a closure for same, and control apparatus for said bowl, closure and jointed frame, in which the elements comprising the control apparatus are arranged to permit a high degree of leverage thereby facilitating the handling of maximum loads with minimum power.

Another object is to confine the elements comprising the control apparatus within the minimum area consistent with a high degree of efficiency, thereby permitting a compact construction which insures a low center of gravity, consequently lessening the possibility of capsizing the implement when going over an irregular ground surface.

A further object is to provide the implement with releasable means for holding it in the raised position, as in transportation, so that the power for actuating the controlling apparatus may be disconnected.

Another object is to provide a latch directly associated with the control means for the bowl and closure, said latch being actuated by said control means to automatically release after the closure reaches a fully opened position, to permit dumping the bowl, and to automatically lock the bowl in the scraping and carrying position.

Another object is to provide an implement having a jointed frame supported at both ends on wheeled carriages, in which the rear frame section is pivotally connected to the rear carriage, the forward frame section swivelably supported on the forward carriage and both frame sections swivelably hinged together between said carriages. This construction renders the frame flexible which tends to maintain the bowl on an even keel when going over an uneven or irregular surface thus lessening the possibility of capsizing the implement.

As a further object, it provides a simple, compact and economically constructed yet substantial power controlled implement by means of which large quantities of material may be removed, transported over uneven surface without turning over, and discharged quickly and efficiently with a minimum of power.

With these and other objects in view the invention consists in the combination, correlation and construction of parts, members and features, which will be described in the specification and will be finally pointed out in the claims.

Referring to the drawings.

Figures 1, 2, 3:
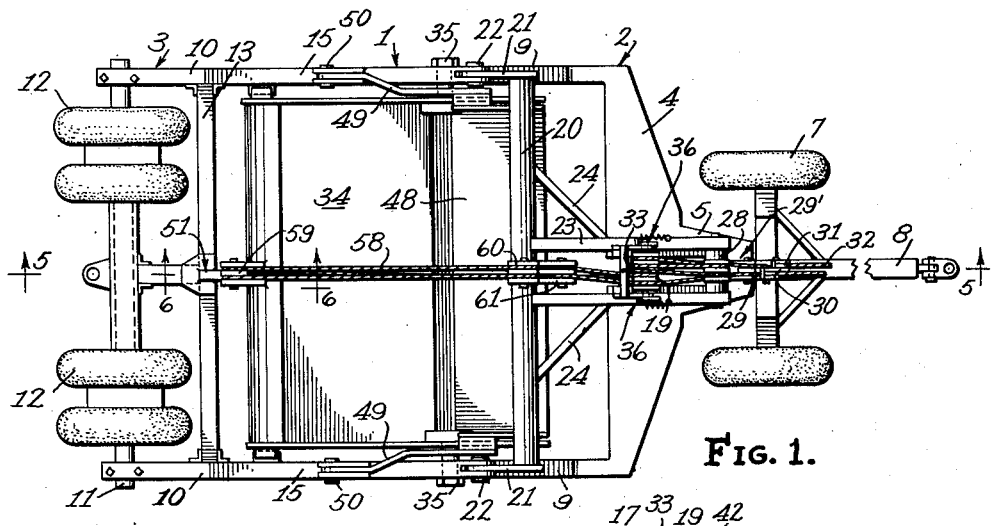
Figure 1 is a plan view of an implement embodying our invention.
Figure 2 is a side elevation of Figure 1, illustrating the implement in the carrying position.
Figure 3 is a side elevation showing the implement in the scraping position.
Figure 4:
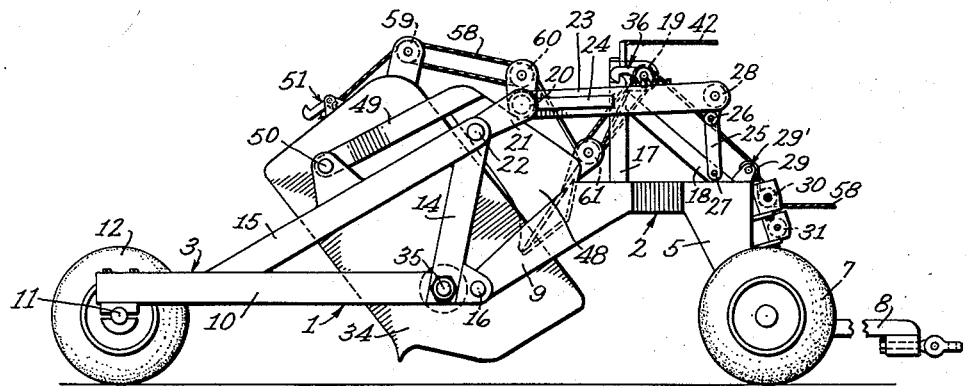
Figure 4 is a side elevation showing the dumping position.
Figure 5:
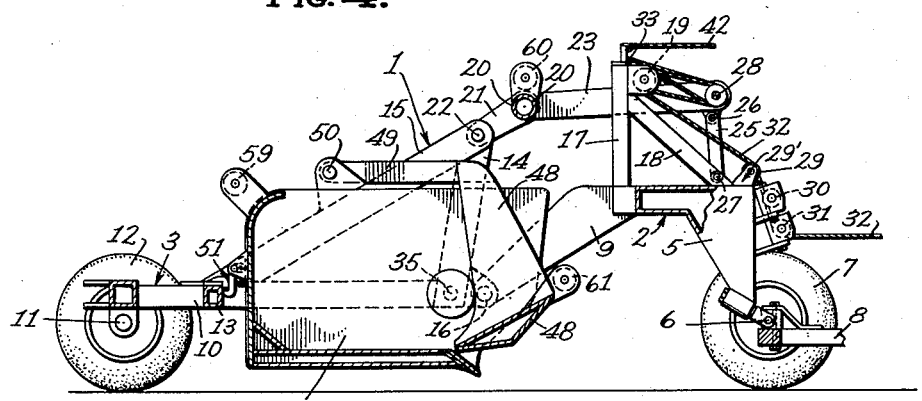
Figure 5 is a section on line 5—5 in Figure 1, in which the cables for dumping the bowl are eliminated.
Figure 6:
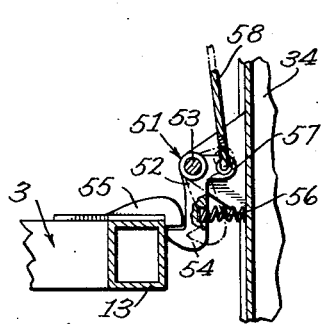
Figure 6 is a section on line 6—6 in Figure 1, showing in detail the latch for locking the bowl in the carrying position.
Figure 7:
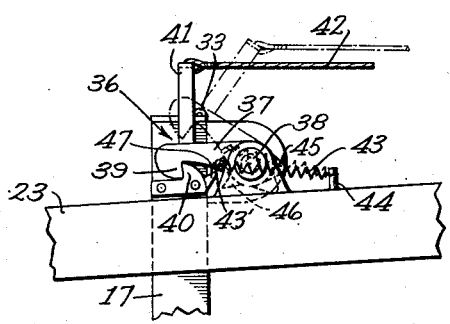
Figure 7 is a detail view showing the latch for holding the implement in the raised position.

The objects outlined above are attained by the forms of embodiment of the invention shown in the drawings, which in a generic sense consists of a forward and rearward frame sections, swivelably jointed together and flexibly supported at the ends on wheeled carriages, a bowl consisting of a forward section fixed to the frame and a rearward section hinged to the forward section, a closure for said bowl, cable means controlling the closure and the bowl, cable means for imparting a knee action to the frame structure to raise and lower the bowl, latch means for said bowl associated with the closure and bowl controlling cable means, latch means associated with the frame sections to maintain the implement in the raised position after power has been disconnected from the raising and lowering cable means.

In the drawings several forms of frame structure are shown in which the above outlined features are incorporated either singly or in combination. It is desired to point out that all of the features may be used either singly or in any combination thereof on any of the illustrated frame structures.

Referring to Figures 1 to 7 inclusive:

In a more specific sense, the form of heavy duty scraper exemplified in these figures in a practical form of embodiment, is shown as comprising a jointed frame structure 1 which includes forward and rearward sections 2 and 3, respectively. The forward section 2 of the frame 1 consists of a transverse member 4 which is provided with a centrally located leg 5 which in turn is swivelably supported, as at 6, on a wheeled carriage 7. The wheeled carriage 7 is equipped with a draft tongue 8, which is adapted in the usual manner for connection to a tractor. At the ends of the transverse member 4 are rearwardly and downwardly extending arms 9.

The rear section 3 of frame 1 consists of forwardly extending arms 10 which are pivotally supported at their rear ends on axle 11 of the wheeled carriage 12. Just ahead of the wheeled carriage 12 and interposed between the arms 10 is a transverse tie member 13. The forward ends of the arms 10 are provided with vertical members 14 which are reinforced by means of diagonal braces 15. The forward and rearward frame sections 2 and 3, respectively, are pivotally connected as at 16.

The transverse member 4, of the frame section 2, carries centrally located thereon, a vertical member 17 which is reinforced by means of the diagonal braces 18. A block of four pulleys is secured to the upper end of the member 17, as illustrated at 19.

A cross member 20, having at its ends arms 21 which decline rearwardly and are pivotally connected to the frame section 3, as indicated at 22, is provided with a pair of forwardly extending arms 23 which are spaced apart to straddle the vertical member 17. The arms 23 are reinforced by diagonal braces 24. The forward ends of arms 23 are supported on links 25 which are pivotally connected to the arms 23, as shown at 26, and to the braces 18, as shown at 27. A block of two pulleys is interposed between the forward ends of arms 23, as indicated at 28. Mounted on the leg 5 of the frame section 2, as indicated at 29', is a pair of idler pulleys 29. Also mounted on the leg 5 are two swiveled pulleys 30 and 31.

A cable 32 dead ended at the upper end of member 17, as shown at 33, is reaved through and between the pulley blocks 19 and 28 then pass over one idler pulley 29 and through the swiveled pulley 31 and is connected to a drum of any conventional hoist on the tractor.

When a pulling force is applied to cable 32 the arms 23 are pushed rearwardly, by reason of the fixed pulley block 19, thereby swinging the rear section 3 upwardly about the axle 11, thus raising bowl 34 which is pivotally mounted on frame section 3, as shown at 35. When the cable 32 is released the weight of the bowl and frame structure lowers same.

To maintain the implement in the raised position while the pulling force on cable 32 is released, as is desirable in transportation, a latching device 36 is provided which consists of two pawls 37 pivotally mounted, one on each arm 23, as shown at 38. Each pawl 37 is provided with a hook 39 which engages a hook 40 secured to the member 17, thus preventing forward movement of arms 23 and consequently maintaining the implement in the raised position. The pawls 37 are connected together by means of a U shaped member 41 to which is secured a cable 42 for releasing pawls 37 upon pulling same. Tension springs 43 are connected at one end to the pawls 37 as shown at 43' and at the other end to arms 23, as shown at 44, for maintaining the pawls in position on either side of the dead center. A tail 45 is provided on each pawl 37 to limit the upwardly swinging movement of said pawls by striking against arms 23. To automatically bring the pawls into engagement with hooks 40 each pawl is provided with a spur 46 which strikes a cam 47 on each hook 40 near the end of the rearward movement of arms 23 thereby swinging the pawls down to engage the hooks 40.

The bowl 34 is provided with closure 48 to retain material in excess of the capacity of the bowl. The closure 48 has a pair of upwardly and rearwardly extending members 49 which are pivotally connected to frame section 3, as shown at 50.

An automatic latching device 51, provided to lock the bowl in the loading and carrying position, comprises a pawl 52 pivotally mounted on the back of bowl 34, as shown at 53, and having a hook 54 adapted to engage a stop 55 on the transverse tie member 13 of frame section 3. A compression spring 56 is interposed between pawl 52 and the back of bowl 34 to force said pawl against the stop 55.

The pawl 52 is provided with a tail 57 to which the dead end of cable 58 is connected. The cable 58 is reaved between a pulley block 59 on the back of the bowl, and a pulley block 60, on the cross member 20, passed to a pulley block 61, on the closure 48, reaved between the pulley block 61 and pulley block 19, on the member 17, passed over the idler pulley 29 and through swiveled pulley 30 then connected to another drum on the conventional hoist mentioned above.

When a pulling force is applied to the cable 58 a block and tackle effect takes place between pulley blocks 19 and 61, thereby first opening the closure 48, which is lighter in weight than the bowl 34. When closure 48 reaches its limit of upwardly swinging movement, by virtue of the members 49 striking the cross member 20, as shown in Figure 3, further pulling force on cable 58 causes a block and tackle effect between pulley blocks 59 and 60, thereby first releasing latch 52 then swinging the bowl about the pivot 35 for discharging. When cable 58 is released the bowl 34 is returned first to its loading position by gravity due to its greater weight than that of the closure and is automatically locked in place by virtue of the pawl 52 latching over the stop 55, further releasing of the cable drops the closure 48.

The latching device 51 releases automatically after the closure 48 has been fully opened due to the fact that the pulling force exerted on the cable 58 must be greater to compress the spring 56 than is necessary to open the closure.

Having thus described our invention we claim:

1. In a scraper including hinged front and rear frame sections, wheeled carriages for supporting the front and rear frame sections, a bowl pivotally carried on the rear frame section, a closure for said bowl pivotally connected to said rear frame section, latch means for holding said bowl in the loading and carrying position, actuating means associated with said closure, bowl and latch means, a forwardly extending yoke pivotally connected to the rear frame section, yielding means for supporting the forward end of said yoke on the front frame section, means associated with said yoke and said front frame section for imparting a knee action to the hinged frame sections, latching means between said yoke and front frame section for holding the bowl in the raised position.

2. In a scraper including front and rear frame sections pivotally connected together, a bowl pivotally mounted on the rear frame section, a closure for said bowl pivotally connected to said rear frame section, a latch on said bowl for holding the bowl in the scraping and carrying position, a cable associated with said closure, bowl and latch for automatically actuating same in the proper sequence.

3. In a scraper including a frame, wheeled supports for said frame, means for raising and lowering said frame, a bowl pivotally carried in said frame, a closure for said bowl, a latch to hold said bowl in the loading and carrying position, a cable associated with said closure bowl and latch to open the closure, release the latch and tilt the bowl upon pulling said cable.

4. In a road scraping vehicle; a pair of frames arranged one in advance of the other; means so connecting one frame to the other that the rear frame can be raised and lowered; a bowl mounted on the rear frame to occupy loading and dumping positions thereon and to be raised and lowered therewith to occupy various load carrying positions; means for latching the bowl in loading position; means for moving the bowl to dumping position; and means for raising the rear frame, comprising at least one toggle joint connecting the two frames, and cable means on the front frame for actuating the toggle joint.

5. In a road scraping vehicle; a pair of frames arranged one in advance of the other; a hinge connection between the confronting ends of said frames to allow the forward end of the rear frame to be elevated; a bowl carried by the rear frame; a toggle joint having a long link connected to the rear frame above said hinge connection, and a short link connected to the long link and to the front frame; and a mechanism connected to said links at their points of connection with each other and to the front frame at a point between the connections of the links with the frame, so that when operated it tends to straighten the links in a manner to exert a rearward pressure on the rear frame and lift the forward end thereof.

6. In a road scraping vehicle; front and rear frames; a connection between the frames to allow the rear frame to be lifted; a bowl pivoted at its mouth or forward end on the rear frame to occupy loading or dumping positions by lowering or elevating its rear or closed end; means for latching the bowl in loading position; a toggle connecting the frames and operable to elevate the rear frame to lift the bowl; and means for actuating the bowl and latching means to first release the bowl and then move it to dumping position.

7. In a road scraping vehicle; front and rear frames; a connection between the frames to allow the rear frame to be lifted; a bowl pivoted at its mouth or forward end on the rear frame to occupy loading or dumping positions by lowering or elevating its rear or closed end; means for latching the bowl in loading position; an apron pivoted on the rear frame to occupy various positions in advance of the mouth of the bowl and an elevated position to allow dumping of earth from the bowl; a toggle connection between the frames; means for actuating the toggle connection to elevate the rear frame and thus lift the bowl and apron; means for actuating the bowl and latching means to first release the bowl and then move it to dumping position; and means for moving the apron to elevated position with movement of the bowl to dumping position.

8. In a road scraping vehicle; a pair of frames arranged one in advance of the other; a hinge connection between the confronting ends of said frames to allow the forward end of the rear frame to be elevated; a bowl carried by the rear frame; a toggle joint having a long link connected to the rear frame above said hinge connection, and a short link connected to the long link and to the front frame; and a cable and sheave mechanism connected to said links at their points of connection with each other and to the front frame at a point between the connections of the links with the frames, so that when operated it tends to straighten the links in a manner to exert a rearward pressure on the rear frame and lift the forward end thereof.

9. In a road scraping vehicle; a pair of frames arranged one in advance of the other; a hinge connection between the confronting ends of said frames to allow the forward end of the rear frame to be elevated; a bowl carried by the rear frame; a toggle joint connecting the two frames above said hinge conection; and means so mounted on the front frame and so connected to the toggle joint that when operated it exerts a force laterally in the plane of the toggle joint and at an angle to the length of the links of the toggle joint.

10. In a road scraping vehicle; front and rear frames; a connection between the frames to allow the rear frame to be lifted; a bowl pivoted at its mouth or forward end on the rear frame to occupy loading or dumping positions by lowering or elevating its rear or closed end; means for latching the bowl in loading position; a toggle connection between the frames; cable means for actuating the toggle connection to elevate the rear frame to lift the bowl; and cable means for actuating the bowl and latching means to first release the bowl and then move it to dumping position.

MAX M. BRODERSEN.
LEN O. BIRD.